Sept. 24, 1957 P. BROWN Re. 24,361
CORRUGATED PACKAGING MATERIAL AND METHOD AND APPARATUS FOR MOLDING THE SAME
Original Filed Sept. 27, 1952 2 Sheets-Sheet 1
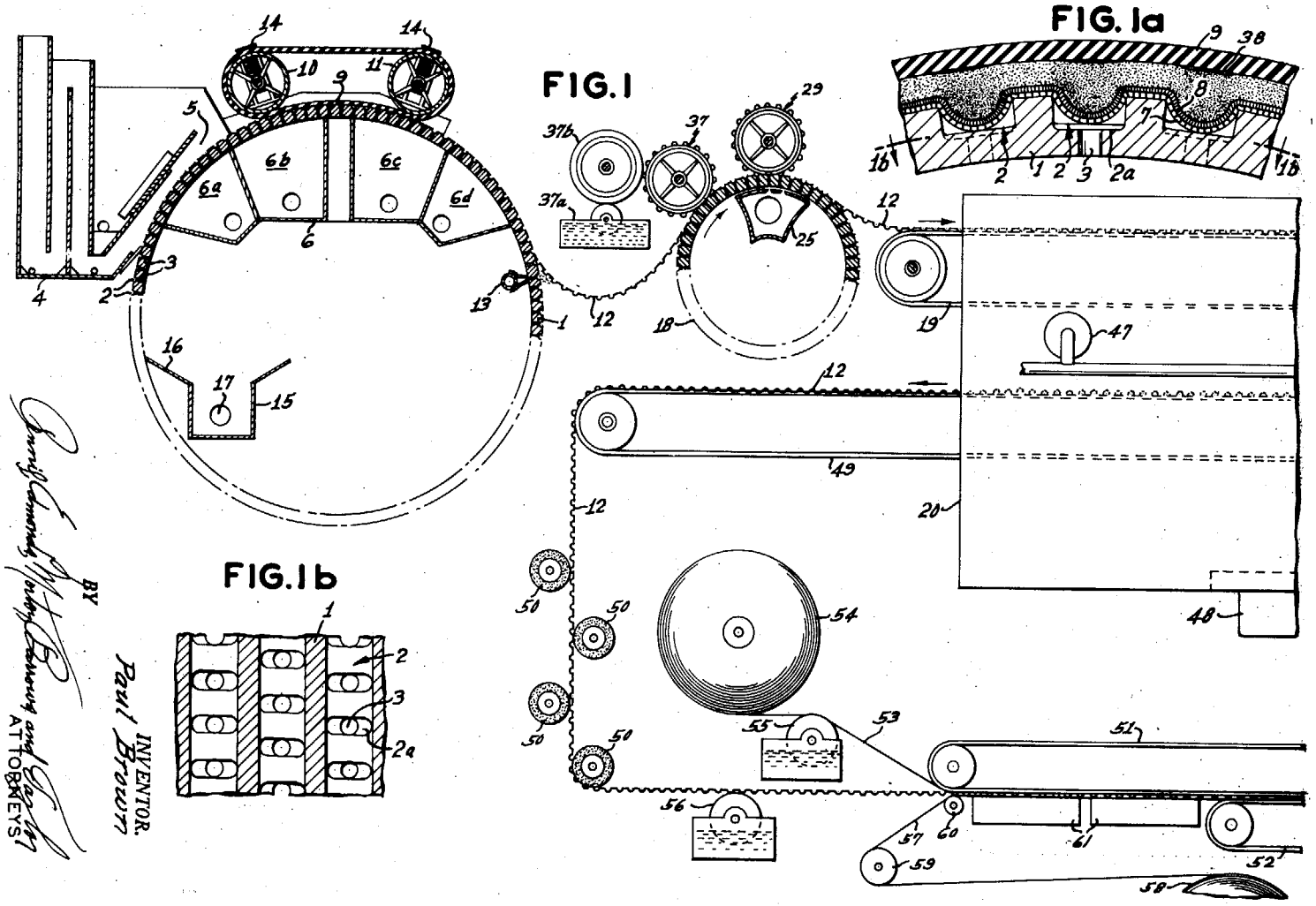
INVENTOR.
Paul Brown
BY
Merrill, Edmonds, Morton, Barrows and Taylor
ATTORNEYS Sept. 24, 1957 P. BROWN Re. 24,361
CORRUGATED PACKAGING MATERIAL AND METHOD AND APPARATUS FOR MOLDING THE SAME
Original Filed Sept. 27, 1952 2 Sheets-Sheet 2
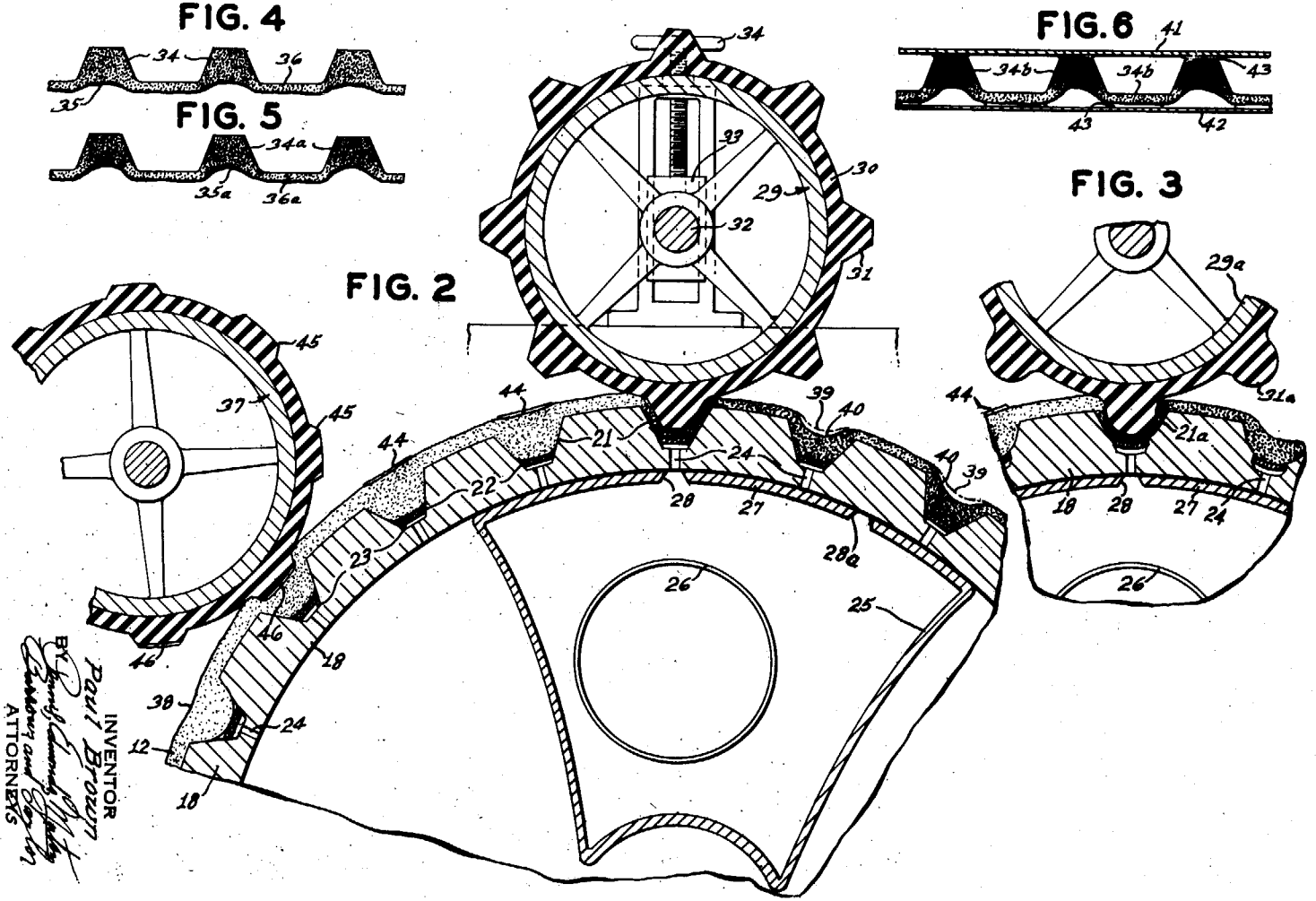
INVENTOR
Paul Brown
BY Pennie, Edmonds, Morton, Barrows and Taylor
ATTORNEYS United States Patent Office Re. 24,361
Reissued Sept. 24, 1957

24,361

CORRUGATED PACKAGING MATERIAL AND METHOD AND APPARATUS FOR MOLDING THE SAME

Paul Brown, New York, N. Y., assignor to Packaging Materials Corp.

Original No. 2,714,340, dated August 2, 1955, Serial No. 311,856, September 27, 1952. Application for reissue August 25, 1955, Serial No. 530,654

15 Claims. (Cl. 92—39)

Matter enclosed in heavy brackets [ ] appears in the original patent but forms no part of this reissue specification; matter printed in italics indicates the additions made by reissue.

This invention relates to improvements in method and apparatus for molding corrugated board and corrugated board products directly from paper pulp, and also to improvements in corrugated board and corrugated board products.

The primary object of the present invention is to provide certain improvements in apparatus of the type disclosed in my prior application, Serial No. 254,691, filed November 3, 1951, now Patent No. 2,680,996, resulting in the fabrication, at a considerably higher rate of production, of corrugated sheet products, such as the flexible felted cushioning material disclosed in U. S. Letters Patent 2,209,537 to Eugene L. Perry, granted July 30, 1940.

One of the problems in fabricating such felted or molded corrugated paper sheet or board is the extraction of the major portion of the water from the molded pulp before it enters the drying section of the apparatus. While the water removal characteristics of the apparatus of my prior application are excellent and the apparatus has proved to be remarkably successful in the commercial production of the corrugated product, it has been found desirable to reduce the amount of fuel required by the drying section of the apparatus. Accordingly, another object of the present invention is to provide for the extraction of a still greater percentage of the water in the pulp before drying so as to further reduce the manufacturing cost.

Another object of the invention is to provide an improved apparatus for the manufacture of the corrugated product of my co-pending application, Ser. No. 530,655, filed August 25, 1955, now Reissue Patent No. Re. 24,120, original application, Serial No. 254,692, [also] filed November 3, 1951 *and now abandoned,* wherein the material of the corrugations or ribs is denser than that of the intervening portions, that is, the material of the ribs on one side is denser than the material of the ribs on the opposite side, this construction producing a corrugated product, either with or without the addition of a backing or reinforcing sheet to one or both sides, which possesses considerable strength and rigidity, as distinguished from the soft flexible corrugated and felted cushioning product of the above mentioned Perry patent.

Another object of the invention is the provision of a new and improved corrugated sheet or board having greatly increased strength and rigidity above any similar sheet hereinbefore produced.

A still further object of the invention is the provision, as a new and improved product, of a laminated corrugated board structure having the characteristics of strength and rigidity comparable to wood.

A still further object of the invention is to provide an improved method and apparatus for fabricating the improved corrugated sheet material and the improved laminated corrugated board, as above described.

The invention will be understood by considering the following detailed description thereof in connection with the accompanying drawings showing both the improved apparatus and the improved products. In these drawings:

Fig. 1 is a diagrammatic sectional view through the cylinders of the apparatus on a plane transverse to their axes of rotation, and also showing in diagrammatic elevation portions of the drying apparatus and the laminating apparatus;

Fig. 1a is an enlarged fragmentary sectional detail of the top portion of the forming cylinder or drum, which is the larger cylinder shown in Fig. 1;

Fig. 1b is a sectional plan view taken on line 1b—1b of Fig. 1a;

Fig. 2 is a greatly enlarged sectional view of the extracting cylinder and associated rolls;

Fig. 3 is a similar view showing a modification of the extracting cylinder and pressure roll;

Fig. 4 is an enlarged cross-sectional view of a flexible, felted, corrugated, cushioning board or sheet which can be fabricated on the improved apparatus;

Fig. 5 is a view similar to Fig. 4 of another corrugated sheet which can be made on the improved apparatus; and Fig. 6 is a view similiar to Fig. 4 of an improved corrugated sheet, and corrugated board product, of the invention.

Referring to the drawings, 1 indicates the forming cylinder upon which the corrugated board is formed or molded, the cylinder having grooves or channels 2 corresponding to the position of the ribs in the molded sheet. The grooves are preferably of substantially rectangular cross section (Fig. 1a) and, at intervals along the bottom of the grooves, holes 3 are provided leading to the interior of the cylinder.

A flow box 4 of any suitable design is mounted adjacent the path of the cylinder at a location above the plane of the horizontal axis of the forming cylinder 1 and to one side of the vertical axial plane of the cylinder on the side of the cylinder where the surface of the cylinder is moving upwardly, this surface constituting one wall of the flow box discharge chamber 5. Within the forming cylinder is a suction box 6, the edges of which are provided in the usual manner with packing contacting the inner surface of the cylinder, whereby pulp will be drawn into the grooves 2 and against the face of the cylinder, and a substantial amount of the water in the pulp will be withdrawn through the perforations in the bottoms of the grooves during the passage of that portion of the drum wall over the suction box.

Suction box 6 is preferably divided into a plurality of chambers 6a, 6b, 6c and 6d, and each may have a separate connection to a suitable vacuum pump or other source of suction. The chambers are divided from one another by walls also provided with packing contacting the inner surface of forming cylinder 1 so that different degrees of vacuum can, if desired, be maintained in the different chambers. Chamber 6a surrounds an area which is opposite flow box 4 and the degree of vacuum maintained in this chamber is the lowest, inasmuch as the pulp at this stage is still in liquid suspension and too high a vacuum would cause substantial amounts of pulp to be drawn through with the water. A high vacuum may be maintained in chambers 6b, 6c and 6d.

The surface of the drum containing the corrugations is covered with one or more sheets of foraminous material, such as wire screening. The screening is not shown in Fig. 1 because of the small scale of that figure, but it will be understood that the screening covers the entire corrugated surface of the drum, and preferably two sheets of screen are used. The construction and arrangement of the screening is shown in Figs. 1a and 1b. The under sheet 7 is of comparatively coarse mesh, while the outer layer 8 is of comparatively fine mesh. The layers of screening are corrugated so that the outer surface of the screen 8 corresponds to the desired contour of the face of the finished paper.

In order to facilitate the proper draining of water from the pulp and also to adequately draw the pulp into the grooves in the wire screening which overlies the grooves 2 in the surface of the cylinder, the grooves in the cylinder and those in the screens are of different contour. Thus, the grooves in the cylinder are of rectangular cross section, while the grooves in the screens are of a different size and shape, for example, of semicircular cross section, as shown in Fig. 1a. As here shown, the crowns of the ribs on the under side of the screening contact the bottoms of the grooves 2 along the middle line thereof, leaving spaces in the corners of the angular grooves to provide unimpeded passage for the water squeezed and drawn out of the pulp in its passage through the machine, while at the same time providing ample support for the screening.

In order to allow free drainage of the water from channels 2 of the forming drum 1, shallow grooves 2a (Figs. 1a and 1b) are provided on each side of the holes 3. Between the holes 3 the bottom face of each of grooves 2 is flat and forms a solid support for contacting the outer surface of each of the ribs in the screens 7 and 8 which are seated in grooves 2.

I also preferably provide a pressing apron 9 of flexible material, such for example as soft rubber, and made in the form of an endless belt which is trained around two supporting rolls 10 and 11, these also preferably being faced with a thick layer of soft rubber. Apron 9 and its supporting rolls extend the full length of forming drum 1 so as to cover the entire width of the pulp layer. Apron 9 may contact the pulp layer as it moves with the cylinder from the flow box for a substantial proportion of the distance to the point where the sheet or web 12 of molded pulp is removed from the drum. The apron is driven at the same speed as the surface of drum 1.

In starting up, an air blast device 13 may be employed to blow the end of the pulp off of the cylinder. Each of the supporting rolls 10 and 11 is rotatably supported by means of brackets 14 provided with spring pressed bearings having provision for adjusting the spring pressure. Preferably also the rolls 10 and 11 can be adjusted radially, and yieldably press the apron against the layer of pulp.

The purpose of apron 9 is to apply mechanical pressure to the outside surface of the pulp layer and thereby assist the vacuum within the vacuum chamber 6 in removing water from the pulp by a squeezing action which is applied continuously over a considerable extent of the travel of the pulp layer over suction boxes 6b, 6c and 6d. As the pulp passes under the apron the pulp is compressed and a larger portion of the entrained water forced through the screens and drum into the suction box than is accomplished by the presser rollers as disclosed in my prior application, above referred to. Any wet pulp or liquid material that flows down the inside of forming cylinder 1 below the flow box 4 is removed by means of a trough 15 having a doctor blade 16 and an outlet 17. The water-solids ratio of the pulp from the time it leaves flow box 4 until it leaves forming cylinder 1 is so reduced that the corrugated web 12 is self-sustaining.

In accordance with an important feature of the present invention, the web or sheet 12 of molded pulp is carried over an extracting cylinder or drum 18 before being heated to evaporate additional water therefrom. This cylinder may be considerably smaller in diameter than the forming cylinder 1 and is driven at the same surface speed so as to take the web at the same rate as it is delivered by cylinder 1. The web 12 is delivered by cylinder 18 to an endless conveyor 19 by which it is carried through the upper portion of the drying section 20 of the apparatus. While it passes over the extracting drum 18 the web is subjected to a high vacuum to remove an additional substantial amount of water therefrom. Preferably, the web is subjected simultaneously to the action of high vacuum and to a considerable mechanical pressure; also certain portions of the web may be coated with an impregnating material to be drawn into and dispersed through the fibers of the web by the action of the high vacuum.

Extracting drum 18, as shown in the enlarged view, in Fig. 2, comprises a cylinder having in its surface a series of channels 21 which correspond in size and shape with grooves 2 of the forming cylinder 1. Channels 21, however, are provided with screening in the form of strips 22 along their bottom portions only which, as shown, are considerably narrower than the mouths of the channels, the side walls of these channels being rigid continuous surfaces instead of yielding perforated surfaces like the walls of the molding grooves of cylinder 1.

In order to facilitate the drainage of water from channels 21 of extracting drum 18, shallow grooves 23 are provided on each side of holes 24 which are spaced lengthwise of the bottoms of channels 21, the construction being similar to that of the forming drum 1. The flat faces of the channel bottoms between the grooves 23 form solid supports for the screening strips 22.

It will be understood that channels 21 extend throughout the length of the extracting cylinder 18 which is of the same length as the forming cylinder 1, and that these cylinders may be several feet in length, depending upon the width of the web which it is desired to form. The drainage holes 24 are arranged in substantially straight rows along the bottoms of channels 21. In order to extract as much water as possible from the molded material within channels 21, an extremely high vacuum of not less than about 15 inches of Hg is applied successively to the rows of holes 24. This vacuum is maintained within a vacuum chamber 25, and since a considerable amount of water is removed through this chamber, it is provided with a large discharge opening 26 which is connected to any suitable source of vacuum.

The upper wall 27 of chamber 24 is provided with two longitudinal slots 28 and 28a each having a width of only two to three times the diameter of the holes 24 and extending lengthwise of chamber 25, preferably at the top portion of the extracting cylinder. Hence, the vacuum is applied only during the two short periods of time during which a given row of holes 24 is passing successively over slots 28 and 28a. Also, the spacing of slots 28 and 28a is different from the spacing of the rows of holes 24, in order to subject the pulp to as high a vacuum as possible. The upper wall 27 of chamber 25 preferably extends for several inches to the left of slot 28, and the same distance to the right of slot 28a, and in close contact with the interior surface of extracting cylinder 18 in order to prevent leakage of air through the slots into the chamber.

So as to extract an additional amount of water from the fibers of the corrugations in the channels 21, and also for the purpose, under certain circumstances, of rendering the material in the corrugations denser than the material in the intervening portions of the corrugated sheet, a press roll 29 is provided. This roll is not necessarily used for making the soft flexible felted corrugated packing sheets for which the board is largely used, but roll 29 is employed, primarily, for making corrugated board having greatly increased fiber in both the ribs and intermediate portions, such as described in my co-pending application hereinabove mentioned, and in which the material of the ribs is also denser than the material of the intervening portions.

The ribbed press roll 29 has a facing 30 of hard rubber or metal, such as bronze, having circumferentially spaced rib portions 31 of the same general contour as channels 21 of extracting cylinder 18, shown in Fig. 2 as being of trapezoidal shape. Roll 29 is driven in timed relation to cylinder 18 so that the ribs compress the pulp in channels 21 simultaneously with the application of suction through slot 28. It is mounted upon a shaft 32 which is supported at its ends in bearing blocks 33. These are carried in suitable brackets and are each adjustable by means of a hand wheel 34 and screw to maintain the surfaces of ribs 29 spaced from the surfaces of channels 21 by a definite distance, whereby the pulp in the channels is pressed to a definite thickness under a controlled squeezing pressure.

With the press roll 29 in position and adjusted to squeeze the pulp in channels 21 to substantially the same thickness as the portions of roll 29 between the ribs 31, squeeze the intermediate portions of the pulp, a very substantial squeezing pressure (much greater than that on the intermediate portions) is exerted on the pulp within the channels, resulting in the forcing out of a substantial amount of water from this pulp.

Such squeezing action and simultaneous subjection to high vacuum on the pulp in any given channel 21 is followed by a second application of the high vacuum when such channel passes over the second slot-like opening 28a. Here the upper surface of the pulp within the channel is freely exposed to the atmosphere so that the suction produced by the high vacuum within chamber 25 has a maximum effect in removing more water from the pulp.

When the apparatus is operated with press roll 29 removed, and only the vacuum within chamber 25 is employed to remove the additional water from the pulp, this is effected by the two successive momentary applications of the suction, as each channel 21 moves successively over the two slots 28 and 28a.

In Fig. 3 there is shown a modified form of extracting cylinder 18a and cooperating ribbed roll 29a, wherein the form of the channels 21a and ribs 31a are rounded instead of being trapezoidal in shape.

The soft flexible felted corrugated packing material, made according to the aforesaid Perry patent, is shown in cross section in Fig. 4 and comprises a sheet or board which is composed of corrugations 34 spaced from each other, each corrugation having a longitudinally extending recess 35 in the underside thereof to enhance the cushioning qualities, and corrugations 34 being interconnected by portions 36 intermediate the corrugations, these intervening portions having substantially the same composition and density as the corrugations. The relatively thick corrugations provide resilient supporting means when the material is in use and the relatively thin connecting portions 36 are easily flexed to bend the sheet longitudinally.

This material is formed with the impregnating roll 37, which will be referred to later on, removed from the machine. Accordingly, as the fiber in channels 21 is subjected to vacuum by the passage of the rows of holes 24 successively in registry with slots 28 and 28a, the comparatively slight recessses 38 (Fig. 1a), which were formed on forming cylinder 1, are considerably deepened by the high vacuum and when this vacuum is released (assuming that the press roll 29 is not in operation), the fiber, being resilient springs back to about the dot-and-dash outline shown at 39 in Fig. 2 which, after the material has passed through the dryer 20, becomes the recess 35 of Fig. 4.

When press roll 29 is used to supplement the action of high vacuum chamber 25, the ribs 31 on this roll will compress the fiber within the channels 21 as they pass underneath roll 29, so that the fiber, after passing to the right of slot 28a, where both the mechanical pressure and vacuum have been released, will spring back to a somewhat less extent, and produce a deeper recess in the finished product.

Depending upon the adjustment of press roll 29, the amount of compression of the fiber in channels 31 can be controlled so as to form a material which is substantially the same as that shown in Fig. 4, or a material as illustrated in Fig. 5 in which the fiber in ribs 34a is not only denser than in the fiber in ribs 34, but is also denser than the fiber in the intermediate portions 36a, which may also be considered as ribs on the opposite face of the sheet. When the press roll 29 is adjusted to produce this latter product, the material after leaving the press roll will spring back only to about the full line indicated at 40 and thus form comparatively deep recesses 35a in the finished product, as shown in Fig. 5.

The improved product of the present invention, which possesses greatly increased strength and rigidity so that it is extremely useful in the manufacture of cartons or other containers, is shown in Fig. 6, and comprises a corrugated sheet or board having ribs or corrugations 34b which are impregnated with a liquid rigidifying or strengthening agent, rendering them rigid, brittle, hard and wood-like. Impregnating material which provides the desired qualities includes a wide range of substances, such as synthetic resin, lignin, sodium silicate, etc. A laminated corrugated board product of great strength, is obtained by applying backing sheets 41 and 42. These sheets of kraft paper of suitable weight may be applied to one, or both sides and secured by means of suitable adhesive 43 to the crowns of ribs 34b and the faces of ribs or intervening portions 36, as shown.

The impregnation is accomplished by coating the surfaces of recesses 38 with layers 44 of liquid impregnating material, which can be done, for example, by the roll 37. This roll is of the same length as the extracting cylinder 18 and is provided with a series of equally spaced flat-topped short ribs 45, the width of which is approximately the same or somewhat less than the width of channels 21 at their outer edges.

Impregnating roll 37 is rotated in timed relation to extracting cylinder 18 so that the coating material 46 is transferred from the ribs 45 to the successive recesses 38 opposite the corrugations of web 12, the impregnating material being supplied to the surfaces of ribs 45 from a suitable reservoir 37a and coating roll 37b.

Impregnating roll 37 may be mounted in any suitable manner, preferably with adjustable bearing blocks similar to those described in connection with press roll 29, so that the short flat ribs 45 may be adjusted to compress the pulp somewhat opposite the corrugations, in transferring the impregnating layer 46 to the pulp to form the coatings 44. This forces the liquid impregnant to a certain extent into the fibers of the web. Then, as the successive corrugations pass opposite the slots 28 and 28a of vacuum chamber 25, the suction through the holes 24 draws the liquid material into substantially all portions of the fiber within the channel 21 so as to produce a substantially uniform impregnation of the liquid material in the corrugations of the web.

Since the press roll 29 is preferably employed in conjunction with the application of the high vacuum when making the impregnated product as shown in Fig. 6, the ribs 31, in compressing the fiber of the corrugations also force the liquid impregnant further into the mass of fibers, thereby supplementing the action of the short ribs 45 of the impregnating roll.

The large water removal on the extracting cylinder is due to the application of the high vacuum and also to a great extent to the fact that a considerable squeezing pressure can be exerted by the press roll 29, inasmuch as the fiber is compressed between the solid side walls of channels 21 and the surfaces of the ribs 31, the single narrow strip 22 of foraminous material at the bottom of each of channels 21 being capable of receiving the pressure from the ends of the ribs 31 without damage.

With the large water removal while the web is on extracting cylinder 18, the amount of moisture left to be removed by the drying chamber 20 is very much reduced, and consequently, the amount of fuel burned in the heaters 47 of the chamber is reduced to a large extent, i. e. by approximately 25%. It will be understood that the drying chambers are provided with suitable blowers such as indicated at 48 for recirculating the air within the chamber and also for expelling moist air from suitable discharge opening (not shown) and for drawing in additional fresh air.

The drying chamber 20, as shown, is provided with two conveyors, the upper endless conveyor 19 and the lower endless conveyor 49, the web 12 being transferred from one conveyor to the other at the right hand end (not shown) of the dryer. When corrugated sheet, as shown in Fig. 6, but without the backing sheets 41 and 42, is to be produced, the dry web 12 as it energes from dryer 20 is either wound on rolls of suitable length for use or storage, or is cut into sheets of the desired dimensions and stored or used.

When, however, one or both of the backing sheets 41 and 42 are to be applied, this is done in the laminating apparatus shown at the lower right hand portion of Fig. 1. The corrugated board is thus produced in one continuous operation from the pulp stage to the final product with one or more backing sheets applied, thus reducing the cost of production, as set forth in my prior application.

The laminating apparatus is disclosed in detail in that application and only a very brief description will be given here. The dry web 12 from conveyor 49 is carried between a series of tension or guide rollers *50* [40] and then passed between two endless pressing belts 51 and 52. A web 53 of paper from a magazine roll 54 receives adhesive from a roll 55 and then is directed to the upper surface of web 12 against which it is pressed by the upper belt 51.

Adhesive is applied directly to the lower surface of web 12 by a roll 56, if it desired to place a backing sheet on the lower surface of the web as well as the upper and a web of paper 57 is fed from a magazine roll 59 and thence, by means of a roller 60, is pressed into contact with the lower surface of web 12. The assembly of layers then passes over one or more heated plates 61, to facilitate drying of the adhesive, and thence through the two pressing belts 51 and 52. When the laminated material leaves the opposite ends of these belts, it may be cut into sheets of the desired dimensions for use or storage.

It will be understood that various changes in the details of the apparatus herein disclosed may be made without exceeding the scope of the invention as defined in the appended claims.

I claim:

1. In a machine for molding corrugated paper board the combination of a molding cylinder for forming from paper pulp a self-sustaining corrugated web, and an extracting cylinder arranged to receive said web therefrom, said extracting cylinder having channels in the surface thereof for the corrugations of the web, and a vacuum device associated with said extracting cylinder for subjecting the pulp within said channels to a vacuum, said device being constructed and arranged to apply the vacuum momentarily and successively to individual channels.

2. In a machine for molding corrugated paper board the combination of a molding cylinder for forming from paper pulp a self-sustaining corrugated web, and an extracting cylinder arranged to receive said web therefrom, said extracting cylinder having channels in the surface thereof for the corrugations of the web, and means associated with said extracting cylinder for simultaneously subjecting the pulp within said channels to a high squeezing pressure and a high vacuum.

3. In a machine as claimed in claim 2 in which means are provided to control the squeezing pressure applied to the pulp in said channels to compress the pulp to a definite thickness.

4. In a machine for molding corrugated paper board the combination of a molding cylinder for forming from paper pulp a self-sustaining corrugated web, and an extracting cylinder arranged to receive said web therefrom, said extracting cylinder having channels in the surface thereof for the corrugations of the web, means associated with said extracting cylinder for subjecting the pulp within said channels to a vacuum, and mechanism operating prior to said vacuum means for applying to the outer surface of the pulp web opposite the corrugations thereof a coating of liquid rigidifying material.

5. In a machine for molding corrugated paper board the combination of a molding cylinder for forming from paper pulp a self-sustaining corrugated web, and an extracting cylinder arranged to receive said web therefrom, said extracting cylinder having channels in the surface thereof for the corrugations of the web, mechanism associated with said extracting cylinder for simultaneously subjecting the pulp within said channels to a squeezing pressure and a high vacuum, and means operating prior to said squeezing pressure and high vacuum means, said means applying to the outer surface of the pulp web opposite the corrugations thereof a coating of liquid rigidifying material.

6. In a machine for molding corrugated paper board the combination of a molding cylinder for forming from paper pulp a self-sustaining corrugated web, and an extracting cylinder arranged to receive said web therefrom, said extracting cylinder having channels in the surface thereof for the corrugations of said web, the walls of said cylinder having unimpeded passages extending from said channels to the interior of said cylinder for the rapid drainage of water from the paper pulp of said corrugations, a vacuum chamber within said extracting cylinder, and means for maintaining a vacuum within said chamber, said vacuum chamber having a wall in sealing relation with the interior surface of said extracting cylinder, and a slot-like opening in said wall, the vacuum within said chamber being applied to said channels momentarily as said drainage passages thereof pass successively in registry with said slot-like opening.

7. In a machine for molding corrugated paper board the combination of a molding cylinder for forming from paper pulp a self-sustaining corrugated web, and an extracting cylinder arranged to receive said web therefrom, said extracting cylinder having channels in the surface thereof for the corrugations of said web, the walls of said cylinder having unimpeded passages extending from said channels to the interior of said cylinder for the rapid drainage of water from the paper pulp of said corrugations, mechanism cooperating with said extracting cylinder for applying liquid rigidifying material to the outer surfaces of the corrugations of said web within said channels, a vacuum chamber within said extracting cylinder, means for maintaining a vacuum within said chamber, said vacuum chamber having a wall in sealing relation with the interior of said extracting cylinder, and a slot-like opening in said wall, the vacuum within said chamber being applied to said channels momentarily as said drainage passages thereof pass successively in registry with said slot-like opening, and serving to simultaneously remove water from the pulp within said channels and draw into the fiber of said pulp said liquid rigidifying material.

8. In a machine for molding corrugated paper board the combination of a molding cylinder for forming from paper pulp a self-sustaining corrugated web, an extracting cylinder arranged to receive said web therefrom, said extracting cylinder having channels in the surface thereof for the corrugations of said web, a strip of foraminous material disposed on the bottom portion only of each of said channels, said channels each having a series of drainage passages below said foraminous material communicating with the interior of said cylinder, a vacuum chamber within said extracting cylinder, means for maintaining a vacuum within said chamber, said vacuum chamber having a wall in sealing relation with the interior of said extracting cylinder, a slot-like opening in said wall, the vacuum within said chamber being applied to said channels momentarily as said drainage passages thereof pass successively in registry with said slot-like opening, and a ribbed press roll mounted for rotation above said extracting cylinder, said roll having projecting ribs arranged to compress the pulp within said channels successively and simultaneously with the registry of said drainage passages with said slot-like opening.

9. In a machine for molding corrugated paper board the combination of a molding cylinder for forming from paper pulp a self-sustaining corrugated web, an extracting cylinder arranged to receive said web therefrom, said extracting cylinder having channels in the surface thereof for the corrugations of said web, a strip of foraminous material disposed on the bottom portion only of each of said channels, said channels each having a series of drainage passages below said foraminous material communicating with the interior of said cylinder, a vacuum chamber within said extracting cylinder, means for maintaining a vacuum within said chamber, said vacuum chamber having a wall in sealing relation with the interior surface of said extracting cylinder, and a slot-like opening in said wall, the vacuum within said chamber being applied to said channels momentarily as said drainage passages thereof pass successively in registry with said slot-like opening, a ribbed press roll mounted for rotation above said extracting cylinder, said roll having projecting ribs arranged to compress the pulp within said channels successively and simultaneously with the registry of said drainage passages with said slot-like opening, and mechanism cooperating with said extracting cylinder ahead of said press roll for applying liquid rigidifying material to the outer surfaces of the corrugations of said web within said channels, the operation of said press roll and the suction of said vacuum causing said rigidifying material to be drawn into and distributed within the fiber of said corrugations.

10. The method of impregnating a partially de-watered corrugated web of paper pulp with a rigidifying agent which comprises applying a coating of liquid rigidifying material to the surface of said web opposite the corrugations thereof, and subjecting the corrugations of the web while still in the channels of the molding cylinder to the action of suction to draw said liquid material into the pulp of said corrugations.

11. The method of impregnating a partially de-watered corrugated web of paper pulp with a rigidifying agent which comprises applying a coating of liquid rigidifying material to the surface of said web opposite the corrugations thereof, and subjecting the upper and lower portions of the corrugations of the web while on the molding cylinder to the successive actions of a mechanical squeezing pressure and of suction to force said liquid material into the pulp of said corrugations.

12. Packaging material comprising a corrugated sheet of molded paper pulp having the ribs on one side thicker than the ribs on the other side and in which the thicker ribs are impregnated with a rigidifying agent thereby substantially increasing the strength of the packaging material.

13. In a machine for molding corrugated paper board the combination of a molding cylinder having a grooved outer surface, means for applying a layer of paper pulp to said surface with said grooves substantially filled with pulp, holes in the cylinder wall along the bottoms of said grooves for the extraction of water from the pulp, and means for pressing said pulp comprising an endless apron of soft flexible material, a pair of rolls for supporting said apron in contact with the pulp, and means for driving said apron at the same speed as the surface speed of said molding cylinder.

*14. Packaging material comprising a molded corrugated sheet of felted fibrous pulp having the ribs on one side thicker than the ribs on the other side, said thicker ribs being impregnated with a rigidifying agent, and a backing sheet adhesively attached to said thicker ribs.*

*15. Packaging material comprising a molded corrugated sheet of felted fibrous pulp having the ribs on one side thicker than the ribs on the other side and in which the thicker ribs are impregnated with a rigidifying agent thereby substantially increasing the strength of the corrugated sheet, and backing sheets adhesively attached to both faces of said corrugated sheet.*

References Cited in the file of this patent or the original patent

UNITED STATES PATENTS

| | | |
|---|---|---|
| 1,661,727 | Koppelman et al. | Mar. 6, 1928 |
| 1,965,265 | Spohn | July 3, 1934 |
| 2,163,585 | Chaplin | June 27, 1939 |
| 2,209,537 | Perry | July 30, 1940 |
| 2,221,200 | Perry | Nov. 12, 1940 |
| 2,568,349 | McKee | Sept. 18, 1951 |
| 2,626,429 | Merrill | Jan. 27, 1953 |
| 2,627,484 | Brown | Feb. 3, 1953 |
| 2,668,786 | Perry | Feb. 9, 1954 |